United States Patent [19]

Cassese

[11] Patent Number: 4,718,804

[45] Date of Patent: Jan. 12, 1988

[54] METALLIC LAMELLA FASTENER FOR WOOD

[76] Inventor: Antoine Cassese, Les Essarts n° 7, Saint Germain Laxis, Maincy, Seine-et-Marne, France

[21] Appl. No.: 935,134

[22] Filed: Nov. 26, 1986

Related U.S. Application Data

[63] Continuation of Ser. No. 701,807, Feb. 19, 1985, abandoned, which is a continuation of Ser. No. 336,439, Dec. 31, 1981, abandoned.

[30] Foreign Application Priority Data

Feb. 16, 1981 [FR] France .................. 81 02957

[51] Int. Cl.$^4$ ............................ F16B 15/00
[52] U.S. Cl. .................. 411/478; 411/477; 411/922
[58] Field of Search .............. 411/442–446, 411/451, 455, 456, 472, 477, 478, 492, 912, 922; 227/120, 156, DIG. 1; 206/344–347

[56] References Cited

U.S. PATENT DOCUMENTS

| | | | |
|---|---|---|---|
| 29,957 | 9/1860 | Duryea | 411/478 |
| 2,096,041 | 10/1937 | Hosking | 411/187 |
| 2,223,596 | 12/1940 | Bowman, Jr. | 411/478 |
| 2,300,767 | 11/1942 | Beegle | 411/478 |
| 2,569,532 | 10/1951 | Marshall et al. | 411/477 |
| 2,741,147 | 4/1956 | Marano | |
| 3,507,384 | 4/1970 | Lippitt | 227/120 |
| 3,828,401 | 8/1974 | Poyak | 411/478 |

FOREIGN PATENT DOCUMENTS

| | | | |
|---|---|---|---|
| 404994 | 9/1934 | Belgium | |
| 550179 | 2/1923 | France | 411/477 |
| 2122842 | 9/1972 | France | |
| 2272628 | 12/1975 | France | |
| 2318715 | 2/1977 | France | 411/477 |
| 336345 | 10/1930 | United Kingdom | 411/446 |

Primary Examiner—Neill Wilson
Attorney, Agent, or Firm—Christel, Bean & Linihan

[57] ABSTRACT

A fastener for wood comprising a metallic lamella having a length which is substantially parallel to the direction the fastener is driven into the wood, and having a protuberance on the back of the lamella which protuberance extends, at the most, across the whole width of the lamella and in a direction substantially perpendicular to the length of the lamella. A plurality of such fasteners arranged in the magazine of a distribution device position themselves correctly owing to the protuberances.

5 Claims, 4 Drawing Figures

METALLIC LAMELLA FASTENER FOR WOOD

This application is a continuation of application Ser. No. 701,807, filed Feb. 19, 1985 as a continuation of Ser. No. 336,439, filed Dec. 31, 1981, both now abandoned.

BACKGROUND OF THE INVENTION

The present invention relates to fasteners developed especially for wood. These fasteners are intended especially for fastening wood frames such as those that surround pictures.

Fasteners of that type have been described, for example, in French Patent Application No. 74 18410 and No. 75 22814, published under No. 2 272 628 and No. 2 318 715, respectively. The latter application relates especially to a fastener which consists of a metallic lamella folded in two along a line close to its centre, one of the horizontal edges of which has a bevelled part formed from the interior face of the fastener, and the vertical edges of which are folded back parallel to the central fold. Such a fastener has a sufficiently small thickness that it does not split the frame.

Fastening devices that can use such fasteners comprise a magazine in which the fasteners are arranged. This magazine comprises a push-rod actuated by the application of pressure in order to push the fasteners as they are required for use. It has been found that devices of that type were liable to misfunction because some fasteners presented themselves incorrectly at the end of the magazine: this resulted in a stoppage of the fastening device in order to deal with the magazine and consequently in a significant loss of time.

It is obvious that incidents of that type occur likewise with fasteners having a flat face of significant size.

SUMMARY OF THE INVENTION

One object of the present invention is therefore to provide a fastener that can be distributed without incident.

Another object of the invention is a fastener of that type, the manufacturing cost of which is not greater than that of traditional fasteners.

Those objects, and others that will appear subsequently, are achieved by a fastener developed according to the present invention which consists of a metallic lamella, the back of which has a protuberance which extends, at most, across the whole width of that lamella.

That protuberance is preferably located in the middle area of the lamella.

Advantageously that protuberance is formed by a swelling.

According to a preferred embodiment, that protuberance is formed by two lips located on each side of a channel provided in the lamella.

DETAILED DESCRIPTION OF THE INVENTION

Figure 1:
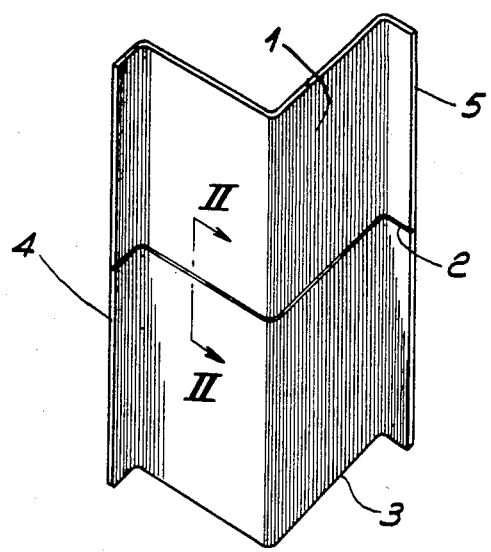
FIG. 1 shows a fastener according to the present invention.

As can be seen in FIG. 1, a fastener according to the present invention consists of a metallic lamella, the back 1 of which has a protuberance 2 which is located in the middle area of the lamella. Said lamella may be a lamella of the type described in French Patent Application No. 75 22814 which is folded forwards along a vertical axis close to its center and one horizontal edge 3 of which has a bevelled portion formed from the inferior face of the fastener, while vertical edges 4 and 5 are folded back externally parallel to said central fold.

Figures 2, 3, 4:
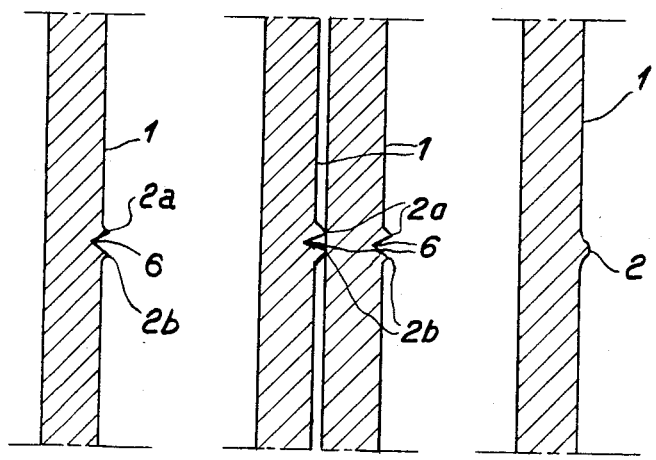
FIG. 2 is a transverse section along the line II—II of FIG. 1 showing a first embodiment of the invention.
FIG. 3 is a transverse section along the line II—II of FIG. 1 showing another embodiment of the invention.
FIG. 4 is a transverse section illustrating a series of fasteners according to the present invention in face-to-face relation in a stack.

Said protuberance 2 may consist, as shown in FIG. 3, of a beading scarcely protruding from said back face 1 of said fastener.

According to a preferred embodiment of the invention, said protuberance 2 is formed by two lips 2a and 2b arranged on each side of a channel 6. In fact, if a channel is made on the back of the metallic lamella forming the fastener by means of, for example, the point of a tool, two lips are formed along this channel.

FIG. 4 shows a series of fasteners according to the present invention in face-to-face relation in a stack.

If said fasteners according to the present invention are arranged in a magazine such as those described above, said fasteners position themselves correctly opposite said distribution device; in fact, under the action of said push-rod and owing to the presence of said protuberance on said back face of said fasteners, the said fastener which is at said distribution device can only assume a correct position.

Although the present invention has been described for fasteners such as those forming the subject of French Patent Application No. 75 22814, it is obvious that it can be applied to all sorts of fasteners, provided that they consist of a lamella having a face of a certain size.

While preferred embodiments of the present invention have been described, it should be understood that the invention is not limited to and is determined solely by the scope of the appended claims.

I claim:

1. A series of fasteners especially for wood and arranged in face-to-face relation in a stack adapted to be received in the magazine associated with a distribution device prior to being driven into the wood, each of said fasteners comprising a lamella being of constant thickness and having first and second main opposite faces which are smooth, wherein only said first face has a protuberance extending in a direction substantially perpendicular to the direction said fastener is driven into wood, said protuberance being located in a central portion of said fastener and projecting slightly beyond said first face, said protuberance bearing on the smooth second face of an adjacent fastener in said stack, said protuberance being exclusively for the purpose of correctly positioning said fastener relative to an adjacent fastener in said stack when received in a magazine associated with the distribution device.

2. A series of fasteners according to claim 1, wherein said protuberance extends, at most, across the whole width of said fastener.

3. A series of fasteners according to claim 1, wherein said protuberance is formed by a swelling.

4. A series of fasteners according to claim 1, wherein said protuberance is formed by two lips and located on each side of a channel provided in the lamella.

5. A series of fasteners according to claim 1 wherein said lamella is metallic and is folded forward along a vertical axis close to a center portion of said lamella, the inferior horizontal edge of said lamella is formed with a bevelled part face, and the vertical edges of which are folded back parallel to said center fold.

* * * * *